(12) United States Patent
Davis et al.

(10) Patent No.: US 11,580,416 B2
(45) Date of Patent: Feb. 14, 2023

(54) IMPROVING THE ACCURACY OF A COMPENDIUM OF NATURAL LANGUAGE RESPONSES

(71) Applicant: International Business Machines Corporation, Armonk, NY (US)

(72) Inventors: Matthew Davis, Cambridge, MA (US); Marco Patricio Crasso, Buenos Aires (AR); Yasaman Khazaeni, Needham, MA (US); Praveen C. Ravichandran, Cambridge, MA (US); Werner Geyer, Newton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 790 days.

(21) Appl. No.: 16/540,906

(22) Filed: Aug. 14, 2019

(65) Prior Publication Data

US 2021/0049476 A1    Feb. 18, 2021

(51) Int. Cl.
  *G06F 17/00* (2019.01)
  *G06N 5/02* (2023.01)
  *G06F 16/33* (2019.01)
  *G06F 40/40* (2020.01)

(52) U.S. Cl.
  CPC ........... *G06N 5/02* (2013.01); *G06F 16/3344* (2019.01); *G06F 40/40* (2020.01)

(58) Field of Classification Search
  CPC ....... G06N 5/02; G06F 16/3344; G06F 40/40; G06F 16/3329; G06F 40/20; G06F 40/30; G06F 40/35
  See application file for complete search history.

(56) References Cited

U.S. PATENT DOCUMENTS

| 197,460 A | 11/1877 | Dicey |
| 6,173,279 B1 | 1/2001 | Levin et al. |
| 7,467,090 B1 | 12/2008 | Stewart et al. |
| 10,909,111 B2 * | 2/2021 | Chang ................. G06F 16/2425 |
| 2008/0311934 A1 | 12/2008 | Soderstrom |
| 2011/0004588 A1 | 1/2011 | Leitersdorf et al. |
| 2012/0165618 A1 | 6/2012 | Algoo et al. |

(Continued)

FOREIGN PATENT DOCUMENTS

| CN | 105824718 A | 4/2016 |
| WO | 2012122198 A1 | 9/2012 |

OTHER PUBLICATIONS

Ring et al., Increasing Engagement with Virtual Agents Using Automatic Camera Motion, College of Computer and Information Science, Northeastern University, Boston, MA, 2016.

*Primary Examiner* — Laurie A Ries
(74) *Attorney, Agent, or Firm* — Garg Law Firm, PLLC; Rakesh Garg; Peter Edwards

(57) ABSTRACT

Using a natural language analysis, it is determined that a compendium requires a natural language response to a natural language query, the compendium comprising a set of stored natural language responses to natural language queries. A relevance of a portion of narrative text to the natural language query is scored according to a query relevance measure, the portion extracted from a corpus of narrative text. The compendium is enhanced according to the query relevance score with information in the portion.

20 Claims, 9 Drawing Sheets

(56) References Cited

U.S. PATENT DOCUMENTS

| | | | |
|---|---|---|---|
| 2013/0211951 A1* | 8/2013 | Kalinin | G06Q 30/0241 |
| | | | 705/26.7 |
| 2013/0295546 A1 | 11/2013 | Bierner et al. | |
| 2013/0297553 A1 | 11/2013 | Bierner | |
| 2016/0012106 A1* | 1/2016 | Franceschini | G06F 16/3344 |
| | | | 707/728 |
| 2016/0110415 A1* | 4/2016 | Clark | G06F 16/332 |
| | | | 707/774 |
| 2017/0061497 A1* | 3/2017 | Akkiraju | G06Q 30/0269 |
| 2017/0228372 A1* | 8/2017 | Moreno | G06F 16/24522 |
| 2017/0344889 A1 | 11/2017 | Sengupta et al. | |
| 2018/0089382 A1* | 3/2018 | Allen | G06F 40/295 |
| 2018/0218427 A1 | 8/2018 | Chu et al. | |
| 2018/0239837 A1* | 8/2018 | Wang | G06F 16/17 |
| 2019/0217206 A1* | 7/2019 | Liu | H04L 51/02 |
| 2019/0258655 A1* | 8/2019 | Williams | G06F 16/313 |
| 2019/0303394 A1* | 10/2019 | Byron | G06F 16/3344 |
| 2019/0377791 A1* | 12/2019 | Abou Mahmoud | G06F 40/226 |
| 2019/0385711 A1* | 12/2019 | Shriberg | G16H 40/67 |
| 2020/0311349 A1* | 10/2020 | Balasubramanian | G06F 40/216 |
| 2021/0019339 A1* | 1/2021 | Ghulati | G06Q 50/00 |
| 2022/0067104 A1* | 3/2022 | Prakash | G06F 16/243 |
| 2022/0114206 A1* | 4/2022 | Platt | G06F 16/35 |

\* cited by examiner

IMPROVING THE ACCURACY OF A COMPENDIUM OF NATURAL LANGUAGE RESPONSES

TECHNICAL FIELD

The present invention relates generally to a method, system, and computer program product for natural language question and answer systems. More particularly, the present invention relates to a method, system, and computer program product for improving the accuracy of a compendium of natural language responses.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, and is also referred to as a Question and Answer system (Q and A system). Cognitive analytics is the process of analyzing available information or knowledge to create, infer, deduce, or derive new information.

A chatbot or conversational interface is software that conducts a natural language conversation with a human user. Typically, the natural language conversation is conducted in text form. However, input to the chatbot can also be converted from another modality, such as speech, into text for processing, then output from the chatbot converted back into speech a human can hear. Chatbots are typically used to aid in customer service or information acquisition.

A natural language utterance supplied to a chatbot system is referred to as a query. A query need not be a grammatical question, or be grammatically correct, but may also be any natural language word or phrase. A response is a natural language utterance supplied by the chatbot system in response to a query. A response also need not be a complete sentence or grammatically correct, but may be any natural language word or phrase. A query and a response to the query constitute a query-response pair. Both queries and responses may be in the form of text, speech, or another form of natural language communication.

SUMMARY

The illustrative embodiments provide a method, system, and computer program product. An embodiment includes a method that determines, using a natural language analysis, that a compendium requires a natural language response to a natural language query, the compendium comprising a set of stored natural language responses to natural language queries. An embodiment scores, according to a query relevance measure, a relevance of a portion of narrative text to the natural language query, the portion extracted from a corpus of narrative text. An embodiment enhances, according to the query relevance score, the compendium with information in the portion.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
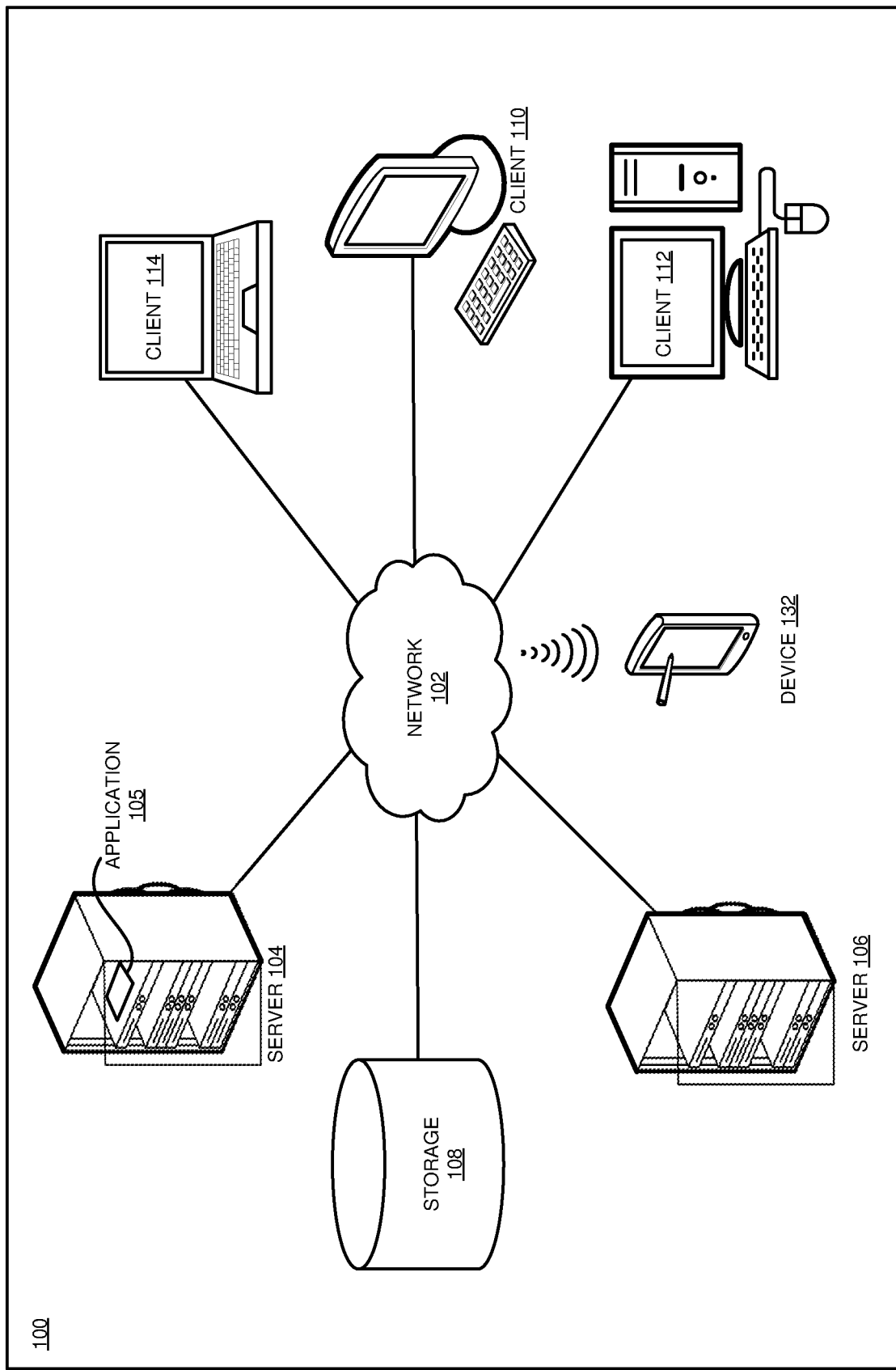
FIG. 1 depicts a block diagram of a network of data processing systems in which illustrative embodiments may be implemented.

The illustrative embodiments recognize that to be useful, a chatbot requires a collection, or compendium, of potential responses to queries. A compendium stores a set of potential responses to natural language queries. The set of potential responses can be stored in narrative text form, or in a different form from which a narrative text form can be generated when a particular response to a query is selected for use. The different form can be one or more subsets of narrative text that are assembled into a response, a rearranged form of textual units (e.g. words) that can be used, rearranged and optionally combined with additional text, to generate a response, or another form that forms the basis of a natural language response to a query. The set of potential responses can also include metadata relating to the narrative text, so that a Natural Language Processing (NLP) engine can readily consume a portion of the narrative text. The metadata can include an identification of grammatical components of the portion according to a grammar. The metadata or the portion can also include a rearrangement of the portion or a subset of the portion by grouping all textual units having a particular part of speech together according to a grammar to facilitate NLP parsing—for example, all subjects, then all objects, then all verbs. In addition, a compendium can store natural language queries or query data corresponding to the stored responses. Once the compendium is available for use, when a query is received, the chatbot matches the query with an appropriate potential response from the compendium and provides that response, or a form of that response, to the querier. In chatbot implementations that do not use public information, using a compendium ensures that required information is readily available when needed. For example, if a chatbot is implemented to answer developer questions about a development tool that is only for internal use, the information the chatbot provides is unlikely to be available in publicly available data sources. Instead, the information is typically contained within an internal policy document, but may not be in a form suitable for answering specific queries. Using a compendium also ensures that potential responses are already in an appropriate form with which to answer queries, such as the responses found in a "Frequently Asked Questions" document. Using a compendium also allows for validation, by human subject matter experts, that each response contains correct information.

The illustrative embodiments also recognize that, as the information a chatbot presents changes, the compendium must be correspondingly changed. Such changes improve the accuracy, or correctness, of the compendium. For example, if new features are added to the example internal development tool, the corresponding chatbot's compendium must also be updated to answer questions relating to the new features. In addition, while some compendium updates can be triggered by a specific event, such as a new product release or a policy update, compendia often include information that requires ongoing monitoring and, if necessary, addition of new responses or updating existing responses to account for new information. However, ongoing monitoring for a large compendium is too complex a task for humans to perform effectively. As a result, the illustrative embodiments recognize that there is a need to identify new or changed information that should be included in a response in the compendium, and then add a corresponding response to the compendium, with as little human intervention as possible.

Consequently, the illustrative embodiments recognize that there is an unmet need to determine whether a chatbot compendium requires an update, identify information that is suitable to include in such an update, create a response including the information, and perform an initial validation on the response before implementing the response in the compendium or providing the response to a human expert for pre-implementation validation.

The illustrative embodiments recognize that the presently available tools or solutions do not address these needs or provide adequate solutions for these needs. The illustrative embodiments used to describe the invention generally address and solve the above-described problems and other problems related to improving the accuracy of a compendium of natural language responses.

An embodiment can be implemented as a software application. The application implementing an embodiment can be configured as a modification of an existing chatbot system, as a separate application that operates in conjunction with an existing chatbot system, a standalone application, or some combination thereof.

Particularly, some illustrative embodiments provide a method for determining that a compendium of natural language responses to natural language queries requires a response to a query that not present in the compendium, extracting and scoring narrative text according to the text's relevance to the query, and if the score is sufficiently high, evaluating the text for addition to the compendium.

An embodiment determines that a compendium of natural language responses to natural language queries requires a response to a query. In particular, an embodiment receives and performs a natural language analysis on a natural language query. One embodiment uses a natural language classifier to classify the query as matching one or more stored potential responses in the compendium. In effect, each stored response is a category into which the incoming query could be classified. The natural language classifier scores all, or a subset, of the potential responses against the query, where the score denotes a degree to which a potential response matches the query. Thus, a response is deemed to match the query if the classifier scores the response with a score higher than a threshold score. If more than one response matches the query, an embodiment uses the potential response with the highest score to respond to the query. Other methods of analyzing and scoring the query, and choosing one or more responses to the query, are also possible and contemplated within the scope of the illustrative embodiments.

If no response has a score higher than the threshold score, there is no potential response in the compendium that is considered a sufficiently good answer to the query. However, if at least one response has a score in between the threshold and a second, lower, threshold, an embodiment concludes that this query is sufficiently relevant to the subject matter of the compendium that a new response to this query should be added to the compendium.

For example, consider a compendium including information on available vacation trips. If an incoming query asks about vacations in England, and an embodiment scores a potential response in the compendium with a value higher than the threshold value (perhaps a score of 0.8, with a threshold of 0.5, all on a 0-1 scale), it is likely that this potential response includes information about vacations in England, and is thus a good response to the query. If an incoming query asks about a particular software product, an embodiment will score all the potential responses in the compendium with very low values, under the lower threshold (perhaps giving each a score of 0.1, with a lower threshold of 0.25, all on the same 0-1 scale) because this is a compendium of vacation information, not software product information, and the query is simply outside the compendium's designed scope. However, if an incoming query asks about vacations in Italy, and an embodiment scores all potential response in the compendium with values in between the two thresholds (perhaps scores of 0.3 or 0.4, all on the same 0-1 scale), this query represents information the compendium should have but does not. Consequently, a new response to this new query should be added to the compendium.

An embodiment also determines that a compendium of natural language responses to natural language queries requires a response to a query by analyzing feedback from a response provided to the query. In particular, due to a false positive score, the embodiment might have provided an incorrect response. However, the querier is likely to provide feedback that the response is incorrect. By conducting a natural language analysis on the provided feedback, an embodiment can conclude that the response is incorrect, and that a new response to this query should be added to the compendium. For example, if an incoming query asks about vacations in Italy, and an embodiment provided a response about vacations in France, the querier might respond with an additional query such as, "I asked about Italy, not France!" By analyzing this additional query, an embodiment concludes that the previously-provided response was incorrect, and that a new, correct, response is needed.

An embodiment uses the results of a natural language analysis of the query to construct a search for information that could constitute a new response to be added to the compendium. One embodiment can use, as a data source for the search, a corpus of documents or other narrative text that has been analyzed and indexed by a natural language analysis tool. Another embodiment can utilize any search engine tool that has an application program interface (API) capable of being used by a software application to find and retrieve the information. The information is typically in the form of narrative text.

An embodiment scores and ranks the search results according to each result's relevance to the natural language query. One embodiment ranks the search results according to a score returned by the search engine corresponding to the degree to which the result corresponds to the search. Another embodiment ranks the search results by analyzing both the query and each result to count keywords, concepts, entities, or a combination in common between the query and each result. Keywords, concepts, and entities can be identified by using any available natural language analysis technique. Another embodiment uses a statistical model to combine the search engine score and the common keywords, concepts, entities, or a combination into one combined numerical score, then uses the combined numerical store to rank the results. Other techniques of computing a relevance between a result and a query are also possible and contemplated within the scope of the illustrative embodiments. In addition, an embodiment need not rank all the results, but instead stop scoring and ranking once one, or a particular number of, results above a threshold relevance score have been obtained.

An embodiment presents one or more of the ranked results to the querier, and attempts to collect feedback on the presented results. One embodiment solicits explicit feedback, asking the querier to select a specific feedback item, answer a question regarding the quality of the response, or otherwise explicitly provide a feedback response. Another embodiment collects implicit feedback, by analyzing one or more queries received from the querier reacting to the presented result. One embodiment conducts a natural language sentiment or emotion analysis, using a commercially available sentiment analysis technique, to determine a sentiment of a follow-up query. A natural language sentiment analysis attempts to identify a sentiment in a portion of narrative text, either in general or towards a particular entity in the text, on a numerical scale from positive through neutral to negative. A natural language emotion analysis attempts to identify a particular emotion in a portion of narrative text, such as anger, disgust, fear, joy, or sadness, each on a numerical scale denoting a detected degree of the particular emotion. For example, a sentiment of a follow-up query such as "great, thanks" could be analyzed as "positive", or an emotion of the follow-up query could be analyzed as high in joy or low in anger. Conversely, a sentiment of a follow-up query such as "no, I meant . . . " could be analyzed as "negative", or an emotion of the follow-up query could be analyzed as high in anger. Another embodiment collects implicit feedback by analyzing an amount of time the querier spends interacting with the response or the information included in the response. For example, if the response, to conserve screen space in a chat displayed on a mobile device with a small screen, included only a one sentence response and a uniform resource locator (URL) to consult for further detail, and the querier selected the URL and spent more than a threshold amount of time at the site denoted by the URL, this could indicate the querier's satisfaction with the response. On the other hand, if the querier did not select the URL and ceased interacting with the chatbot, this could indicate the querier's lack of satisfaction with the response.

If user feedback is above a threshold level of satisfaction with a presented result, one embodiment uses information in the presented result to form a response and add the response to the compendium for use in answer future queries. Another embodiment presents the query and potential response to a subject matter expert for validation and optional further editing before adding the response to the compendium. A querier's feedback may have been positive even if the data in a response was actually incorrect, and allowing a subject matter expert to review a potential response provides an additional assurance of correctness.

The manner of improving the accuracy of a compendium of natural language responses described herein is unavailable in the presently available methods in the technological field of endeavor pertaining to conversational interfaces. A method of an embodiment described herein, when implemented to execute on a device or data processing system, comprises substantial advancement of the functionality of that device or data processing system in determining that a compendium of natural language responses to natural language queries requires a response to a query that not present in the compendium, extracting and scoring narrative text according to the text's relevance to the query, and if the score is sufficiently high, evaluating the text for addition to the compendium.

The illustrative embodiments are described with respect to certain types of queries, responses, narrative texts, analyses, feedback, scores, thresholds, validations, rankings, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
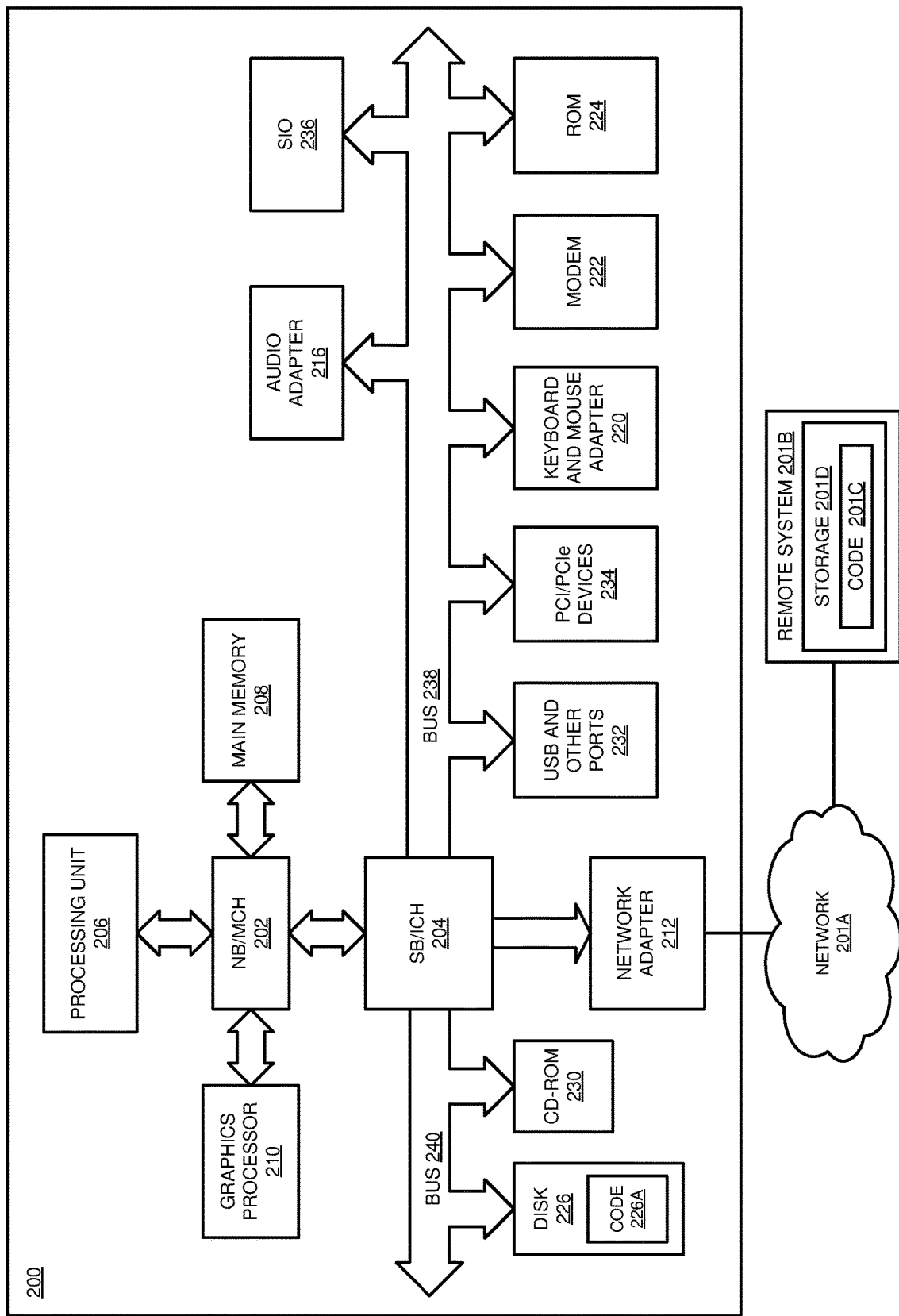
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132. A compendium of potential responses can be stored in storage 108 or in any other suitable location.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
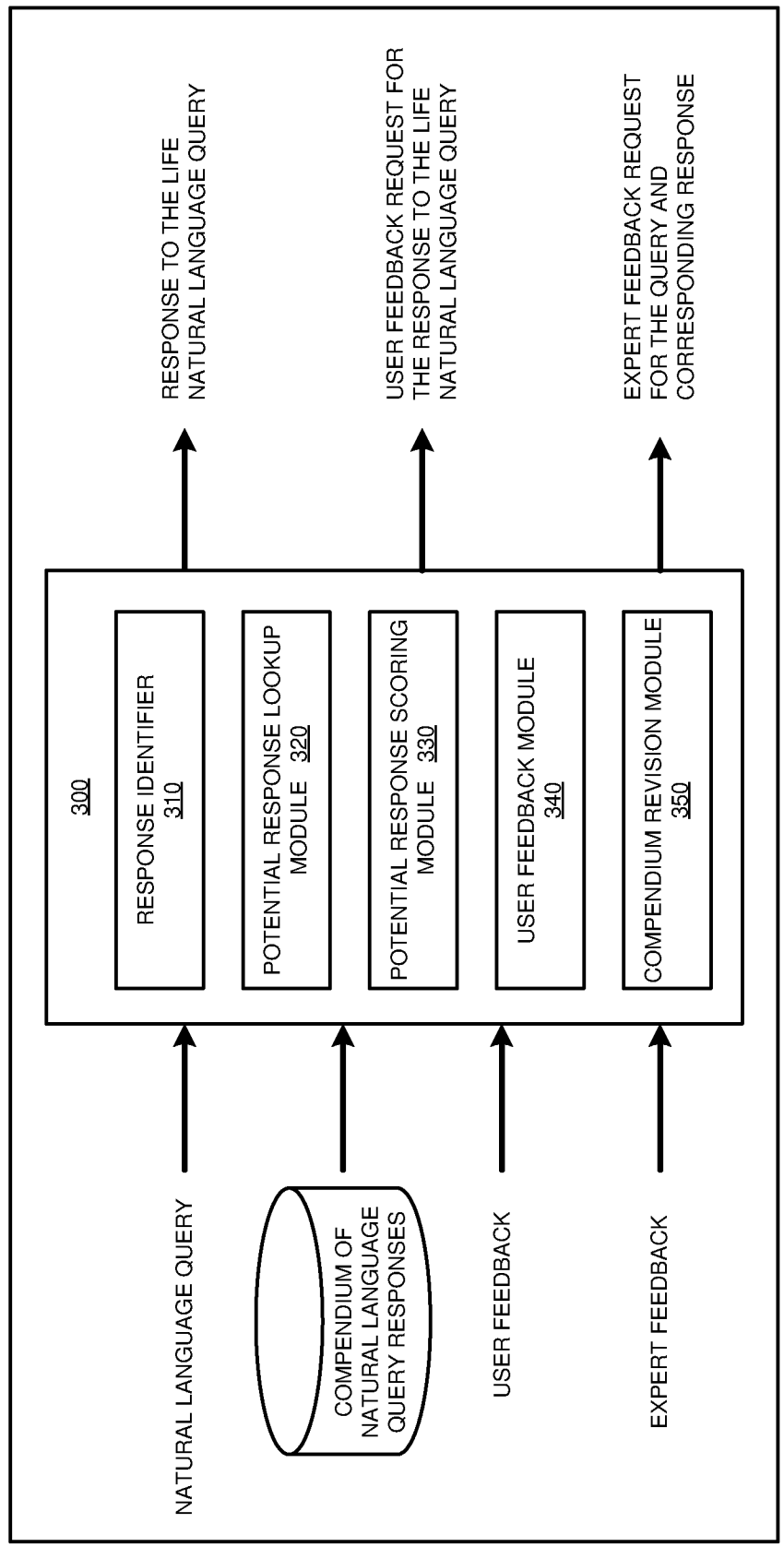
FIG. 3 depicts a block diagram of an example configuration for improving the accuracy of a compendium of natural language responses in accordance with an illustrative embodiment.

With reference to FIG. 3, this figure depicts a block diagram of an example configuration for improving the accuracy of a compendium of natural language responses in accordance with an illustrative embodiment. Application 300 is an example of application 105 in FIG. 1 and can execute in any of servers 104 and 106, clients 110, 112, and 114, and device 132 in FIG. 1.

Response identifier 310 determines that a compendium of natural language responses to natural language queries requires a response to a query. In particular, module 310 receives a natural language query and uses a natural language classifier to classify the query as matching one or more stored potential responses in the compendium. In effect, each stored response is a category into which the incoming query could be classified. The natural language classifier scores all, or a subset, of the potential responses against the query, where the score denotes a degree to which a potential response matches the query. Thus, a response is deemed to match the query if the classifier scores the response with a score higher than a threshold score. If more than one response matches the query, module 310 uses the potential response with the highest score to respond to the query.

If no response has a score higher than the threshold score, there is no potential response in the compendium that is considered a sufficiently good answer to the query. However, if at least one response has a score in between the threshold and a second, lower, threshold, application 300 concludes that this query is sufficiently relevant to the subject matter of the compendium that a new response to this query should be added to the compendium.

Application 300 also determines that a compendium of natural language responses to natural language queries requires a response to a query by using user feedback module 340 to analyze feedback from a response provided to the query. In particular, due to a false positive score, application 300 might have provided a response to a query that was incorrect. However, the querier is likely to provide feedback that the response is incorrect. By conducting a natural language analysis on the provided feedback, application 300 can conclude that the response is incorrect, and that a new response to this query should be added to the compendium.

Potential response lookup module 320 uses the results of a natural language analysis of the query to construct a search for information that could constitute a new response to be added to the compendium. Module 320 can use, as a data source for the search, a corpus of documents or other narrative text that has been analyzed and indexed by a natural language analysis tool. Module 320 can also utilize any search engine tool that has an application program interface (API) capable of being used by a software application to find and retrieve the information. The information is typically in the form of narrative text.

Potential response scoring module 330 scores and ranks the search results according to each result's relevance to the natural language query. Module 330 can be configured to rank the search results according to a score returned by the search engine corresponding to the degree to which the result corresponds to the search. Module 330 can also be configured to rank the search results by analyzing both the query and each result to count keywords, concepts, entities, or a combination in common between the query and each result. Module 330 can also be configured to use a statistical model to combine the search engine score and the common keywords, concepts, entities, or a combination into one combined numerical score, then use the combined numerical store to rank the results.

User feedback module 340 presents one or more of the ranked results to the querier, and attempts to collect feedback on the presented results. Module 340 can solicit explicit feedback, asking the querier to select a specific feedback item, answer a question regarding the quality of the response, or otherwise explicitly provide a feedback response.

Module 340 can also collect implicit feedback, by analyzing one or more queries received from the querier reacting to the presented result. In one configuration, module 340 conducts a natural language sentiment or emotion analysis, using a commercially available sentiment analysis technique, to determine a sentiment of a follow-up query. Another configuration of module 340 collects implicit feedback by analyzing an amount of time the querier spends interacting with the response or the information included in the response.

If user feedback is above a threshold level of satisfaction with a presented result, compendium revision module 340 uses information in the presented result to form a response and add the response to the compendium for use in answer future queries. Module 340 can also present the query and potential response to a subject matter expert for validation and optional further editing before adding the response to the compendium. A querier's feedback may have been positive even if the data in a response was actually incorrect, and allowing a subject matter expert to review a potential response provides an additional assurance of correctness.

Figure 4:
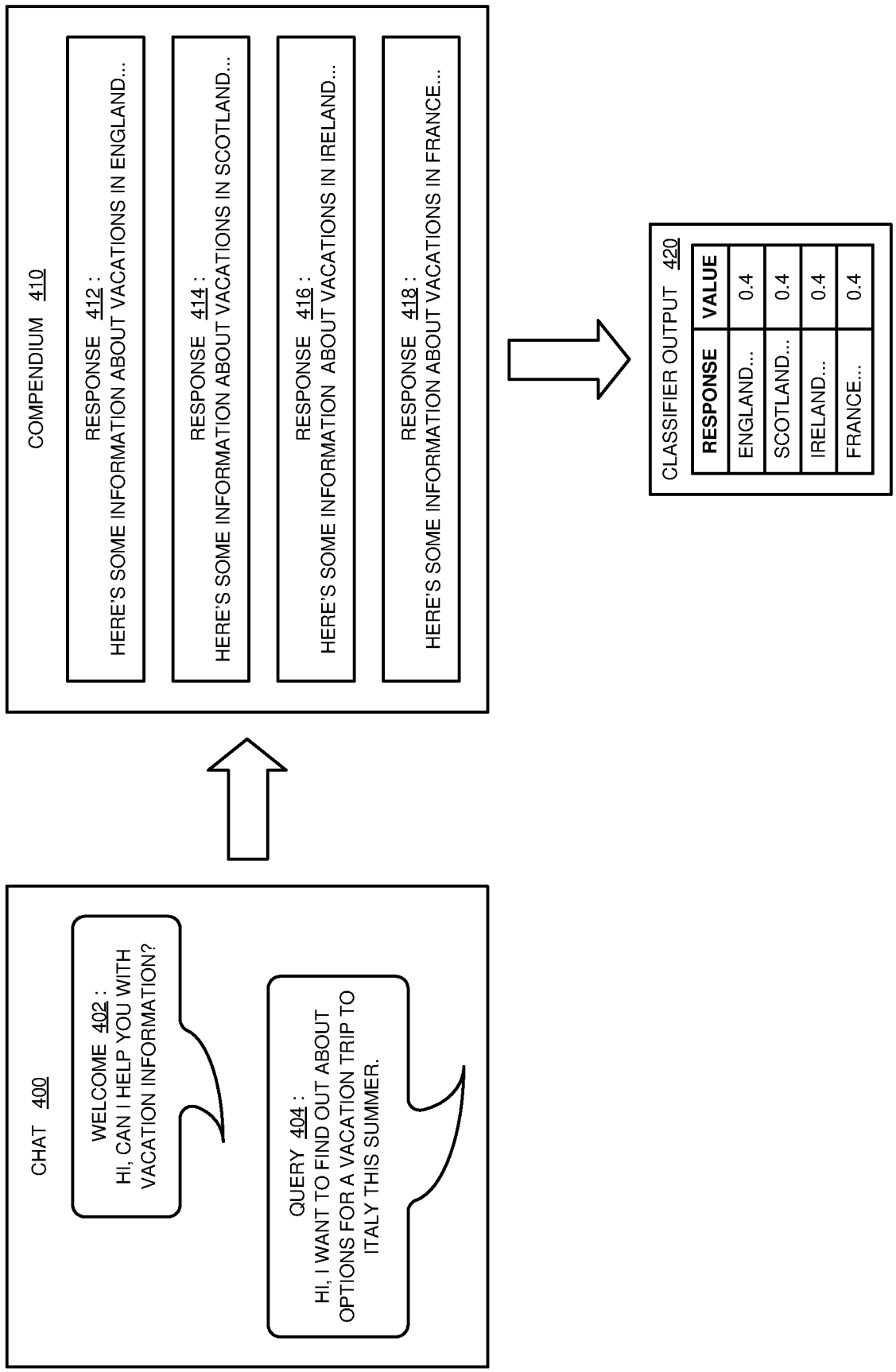
FIG. 4 depicts an example of improving the accuracy of a compendium of natural language responses in accordance with an illustrative embodiment.

With reference to FIG. 4, this figure depicts an example of improving the accuracy of a compendium of natural language responses in accordance with an illustrative embodiment. The example can be executed using application 300 in FIG. 3.

Chat 400 is a transcript of a portion of an interaction between a user and a chatbot including application 300. Chat 400 includes welcome 402, a welcome message from the chatbot, and query 404, a natural language query about vacations in Italy in the summer. Note that query 404 is still a natural language query, even though not in a grammatical form of a question.

Application 300 applies query 404 to compendium 410, which includes responses 412, 414, 416, and 418. In particular, application 300 uses a natural language classifier to classify query 404 as matching one or more stored potential responses in the compendium. The results are shown in classifier output 420, in which each of responses 412, 414, 416, and 418 is scored at 0.4 on a 0-1 scale. Because each response has a score in between a higher threshold (here, 0.5) and a lower threshold (here, 0.25), application 300 concludes that query 404 is sufficiently relevant to the subject matter of compendium 410 that a new response to query 404 should be added to compendium 410.

Figure 5:
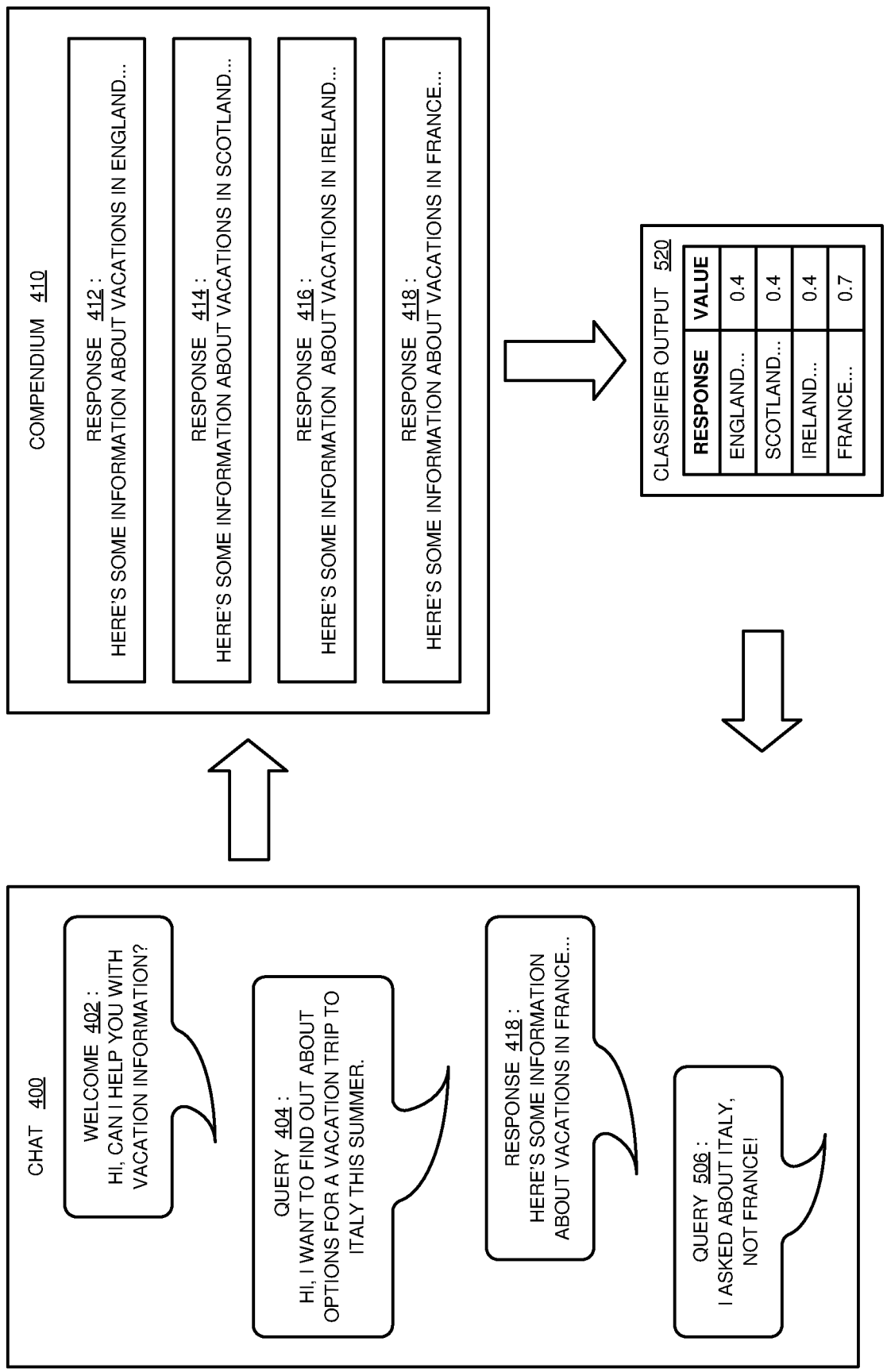
FIG. 5 depicts an example of improving the accuracy of a compendium of natural language responses in accordance with an illustrative embodiment.

With reference to FIG. 5, this figure depicts an example of improving the accuracy of a compendium of natural language responses in accordance with an illustrative embodiment. Chat 400, welcome 402, query 404, compendium 410, and responses 412, 414, 416, and 418 are the same as chat 400, welcome 402, query 404, compendium 410, and responses 412, 414, 416, and 418 in FIG. 4. The example can be executed using application 300 in FIG. 3.

As in FIG. 4, Application 300 applies query 404 to compendium 410, which includes responses 412, 414, 416, and 418. In particular, application 300 uses a natural language classifier to classify query 404 as matching one or more stored potential responses in the compendium. The results are shown in classifier output 520. Here, in contrast to FIG. 4, the classifier has scored response 418, relating to vacations in France, as 0.7. Because this score is above the high threshold score (0.5), this score indicates that response 418 is a relevant response to query 404. As a result, application 400 supplies response 418 in chat 400.

However, response 418 has resulted in query 506, in which the querier complains about response 418. Here, because of the false positive score for response 418, application 300 has provided an incorrect response to query 404. However, by conducting a natural language analysis on the provided feedback, query 506, application 300 can conclude that response 418 is incorrect, and that a new response to query 404 should be added to the compendium.

Figure 6:
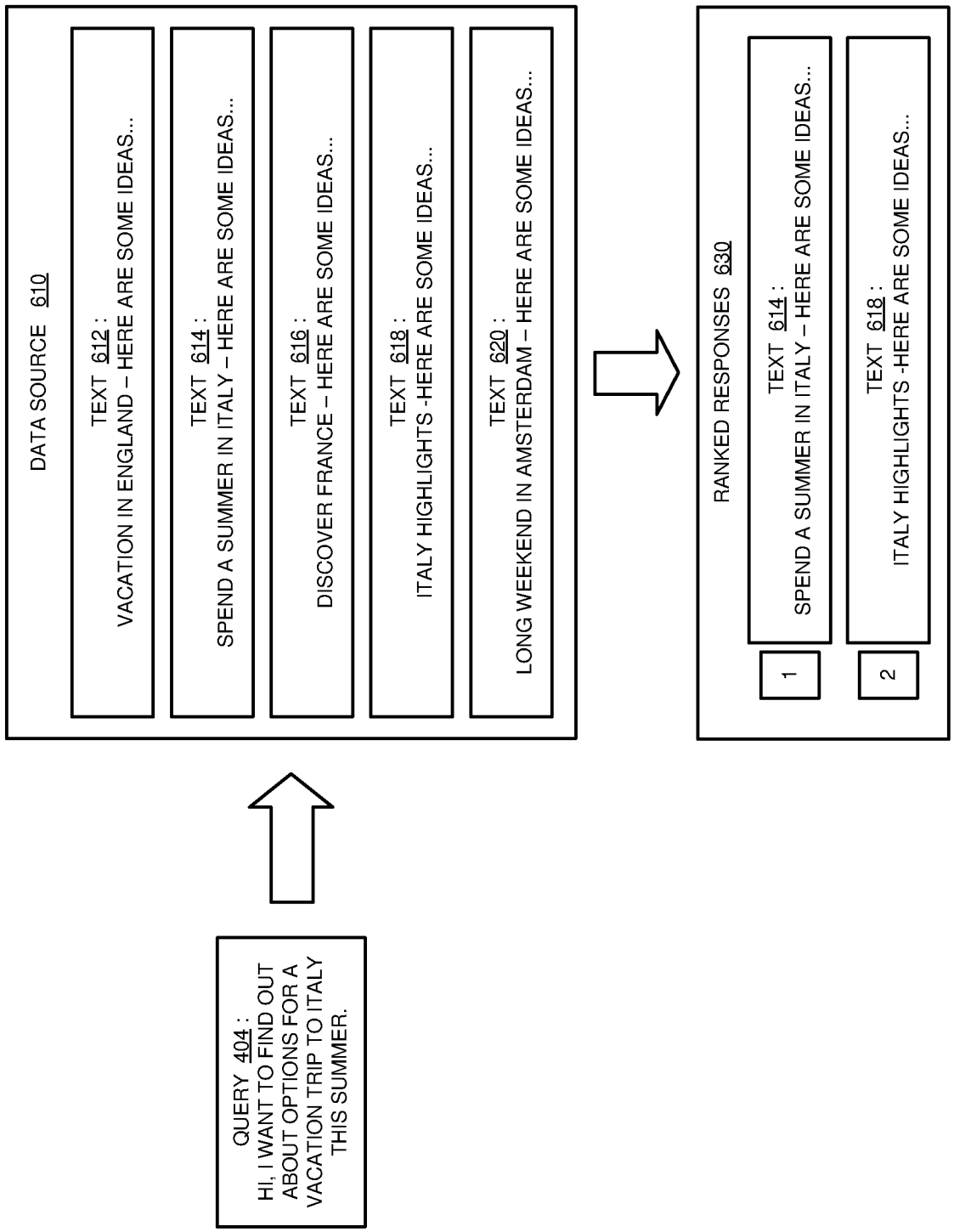
FIG. 6 depicts a continuation of an example of improving the accuracy of a compendium of natural language responses in accordance with an illustrative embodiment.

With reference to FIG. 6, this figure depicts a continuation of an example of improving the accuracy of a compendium of natural language responses in accordance with an illustrative embodiment. In particular, FIG. 6 continues the example depicted in either FIG. 4 or FIG. 5. Query 404 is the same as query 404 in FIG. 4.

Because application 300 has determined that a new response to query 404 should be added to compendium 410, application 300 constructs a search for information that could constitute a new response to be added to compendium 410. Thus, application 300 searches data source 610, which includes narrative texts 612, 614, 616, 618, and 620, each relating in some degree to European travel. Here, application 300 has scored and ranked the search results, as shown in ranked responses 630. In particular, narrative text 614, relating to summer in Italy, is ranked first, and narrative text 618, also relating to Italy but not specifically summer, is ranked second.

Figure 7:
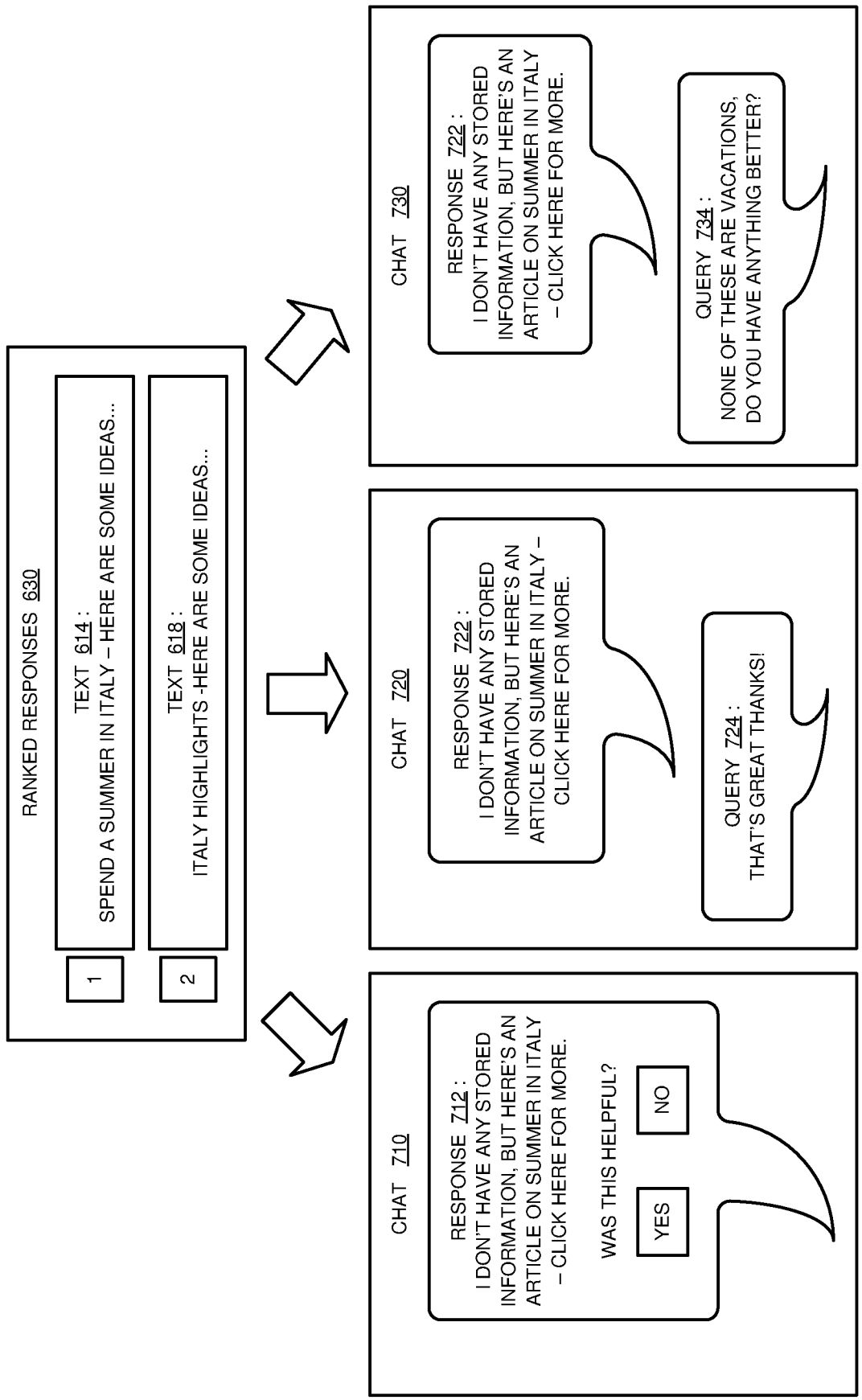
FIG. 7 depicts a continuation of an example of improving the accuracy of a compendium of natural language responses in accordance with an illustrative embodiment.

With reference to FIG. 7, this figure depicts a continuation of an example of improving the accuracy of a compendium of natural language responses in accordance with an illustrative embodiment. In particular, FIG. 7 continues the example depicted in FIG. 6. Ranked responses 630 and narrative texts 614 and 618 are the same as ranked responses 630 and narrative texts 614 and 618 in FIG. 6.

Because text 614 is ranked first, application 300 presents one or more of the ranked results to the querier, and attempts to collect feedback on the presented results. Chat 710 depicts solicitation of explicit feedback, in which response 712 in chat 710 presents the information in text 614 and asks the querier to answer a question regarding the quality of the response. Chats 720 and 730 depict solicitation of implicit feedback. In chat 720, response 722 presents the information in text 614. The querier responds with query 724, which application 300 analyzes to determine that the querier is satisfied with the response. In chat 730, response 722 also presents the information in text 614. This time the querier responds with query 734, which application 300 analyzes to determine that the querier is not satisfied with the response.

Figure 8:
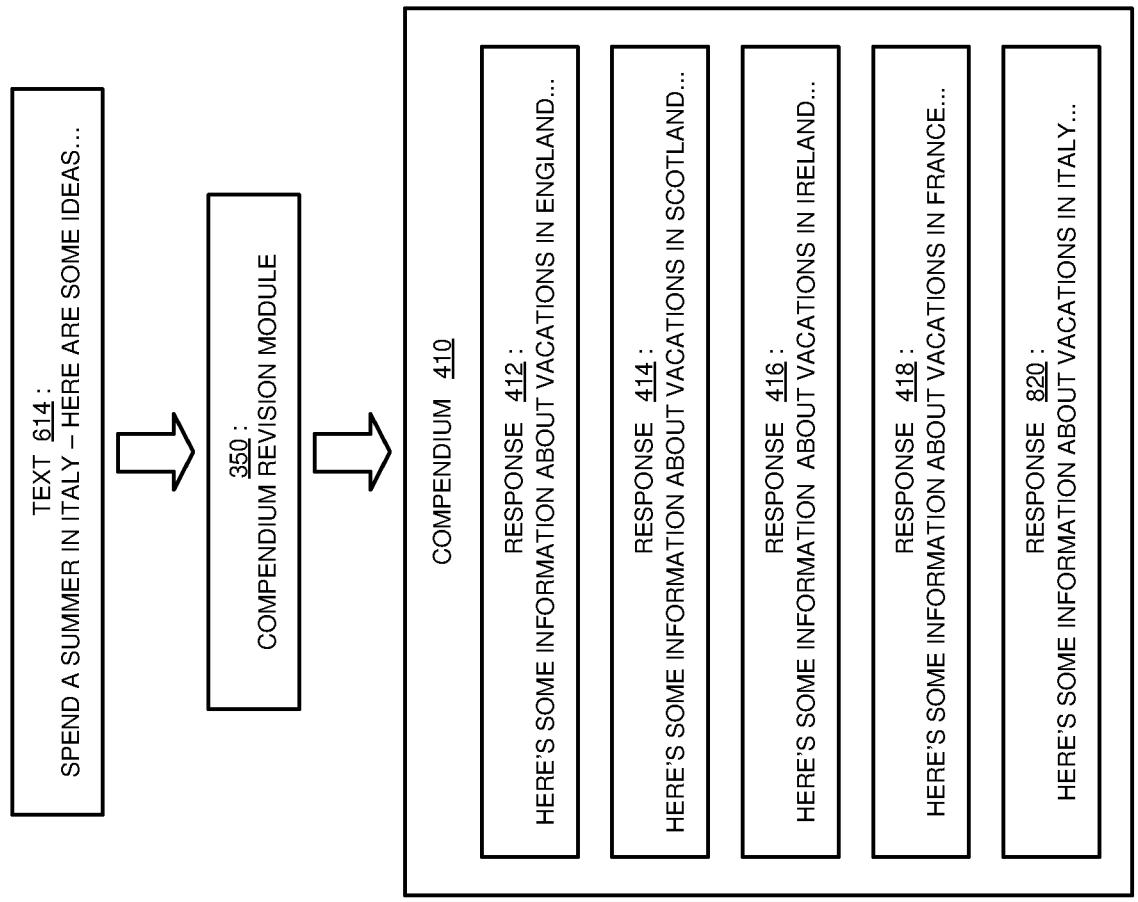
FIG. 8 depicts a continuation of an example of improving the accuracy of a compendium of natural language responses in accordance with an illustrative embodiment.

With reference to FIG. 8, this figure depicts a continuation of an example of improving the accuracy of a compendium of natural language responses in accordance with an illustrative embodiment. In particular, FIG. 8 continues the example depicted in FIG. 7. Compendium revision module 350 is the same as compendium revision module 350 in FIG. 3. Compendium 410 and responses 412, 414, 416, and 418 are the same as compendium 410 and responses 412, 414, 416, and 418 in FIG. 4. Narrative text 614 is the same as narrative text 614 in FIG. 6.

As depicted, because text 614 received positive feedback in chat 720, and because the text of response 820 has been validated by a subject matter expert, compendium revision module 350 has added response 820 to compendium 410 to be available to answer future queries.

Figure 9:
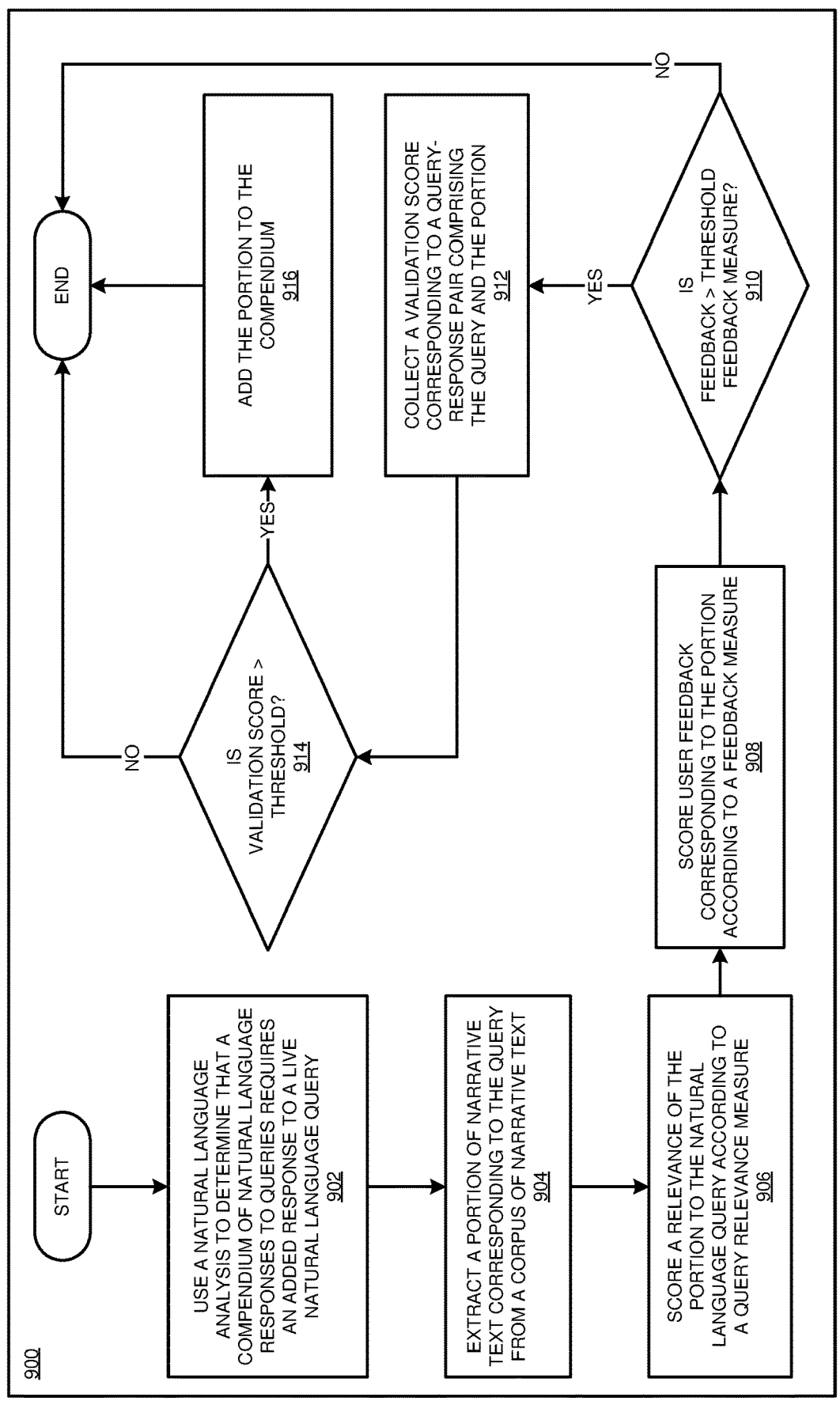
FIG. 9 depicts a flowchart of an example process for improving the accuracy of a compendium of natural language responses in accordance with an illustrative embodiment.

With reference to FIG. 9, this figure depicts a flowchart of an example process for improving the accuracy of a compendium of natural language responses in accordance with an illustrative embodiment. Process 900 can be implemented in application 300 in FIG. 3.

In block 902, the application uses a natural language analysis to determine that a compendium of natural language responses to queries requires an added response to a live natural language query. In block 904, the application extracts a portion of narrative text corresponding to the query from a corpus of narrative text. In block 906, the application scores a relevance of the portion to the natural language query according to a query relevance measure. In block 908, the application scores user feedback corresponding to the portion according to a feedback measure. In block 910, the application checks whether the feedback is greater than a threshold feedback measure. If yes ("YES" path of block 910), in block 912, the application collects a validation score corresponding to a query-response pair comprising the query and the portion. In block 914, the application checks whether the validation score is greater than a threshold. If yes ("YES" path of block 914), in block 916, the application adds the portion to the compendium. Then (also "NO" paths of blocks 910 and 914) the application ends.

Thus, a computer implemented method, system or apparatus, and computer program product are provided in the illustrative embodiments for improving the accuracy of a compendium of natural language responses and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining, using a natural language analysis, that a compendium requires an addition of a natural language response to a natural language query, the compendium comprising a set of stored natural language responses to natural language queries;
    scoring, according to a query relevance measure, a relevance of a portion of narrative text to the natural language query, the portion extracted from a corpus of narrative text; and
    enhancing, according to the query relevance score, the compendium with information in the portion.

2. The computer-implemented method of claim 1, wherein the natural language analysis comprises a natural language classifier, wherein determining that the compendium requires an addition of a natural language response to a natural language query comprises determining, using the natural language classifier, that a classification of the natural language query into any of the set of stored natural language responses is below a first threshold confidence level and above a second threshold confidence level, the first threshold confidence level being above the second threshold confidence level.

3. The computer-implemented method of claim 1, wherein the determining comprises:
scoring, according to a second feedback measure, second user feedback corresponding to a stored natural language response in the set of stored natural language responses, the stored natural language response presented in response to the natural language query; and
determining, responsive to the second user feedback score being below a threshold user feedback score, that the compendium requires the natural language response.

4. The computer-implemented method of claim 3, wherein scoring, according to a feedback measure, user feedback corresponding to the portion comprises:
collecting user feedback input corresponding to the portion relative to the natural language query.

5. The computer-implemented method of claim 3, wherein scoring, according to a feedback measure, user feedback corresponding to the portion comprises:
scoring, using a natural language analysis, a natural language statement received in response to presenting the portion.

6. The computer-implemented method of claim 1, wherein the enhancing comprises:
scoring, according to a feedback measure, user feedback corresponding to the portion.

7. The computer-implemented method of claim 6, further comprising:
collecting, responsive to the feedback measure being above a threshold feedback measure, a validation score corresponding to a query-response pair comprising the natural language query and the portion.

8. The computer-implemented method of claim 7, further comprising:
adding, responsive to the validation score being above a threshold validation score, the portion to the compendium.

9. A computer usable program product comprising one or more computer-readable storage devices, and program instructions stored on at least one of the one or more storage devices, the stored program instructions comprising:
program instructions to determine, using a natural language analysis, that a compendium requires an addition of a natural language response to a natural language query, the compendium comprising a set of stored natural language responses to natural language queries;
program instructions to score, according to a query relevance measure, a relevance of a portion of narrative text to the natural language query, the portion extracted from a corpus of narrative text; and
program instructions to enhance, according to the query relevance score, the compendium with information in the portion.

10. The computer usable program product of claim 9, wherein the natural language analysis comprises a natural language classifier, wherein determining that the compendium requires an addition of a natural language response to a natural language query comprises determining, using the natural language classifier, that a classification of the natural language query into any of the set of stored natural language responses is below a first threshold confidence level and above a second threshold confidence level, the first threshold confidence level being above the second threshold confidence level.

11. The computer usable program product of claim 9, wherein the determining comprises:
program instructions to score, according to a second feedback measure, second user feedback corresponding to a stored natural language response in the set of stored natural language responses, the stored natural language response presented in response to the natural language query; and
program instructions to determine, responsive to the second user feedback score being below a threshold user feedback score, that the compendium requires the natural language response.

12. The computer usable program product of claim 11, wherein program instructions to score, according to a feedback measure, user feedback corresponding to the portion comprises:
program instructions to collect user feedback input corresponding to the portion relative to the natural language query.

13. The computer usable program product of claim 11, wherein program instructions to score, according to a feedback measure, user feedback corresponding to the portion comprises:
program instructions to score, using a natural language analysis, a natural language statement received in response to presenting the portion.

14. The computer usable program product of claim 9, wherein the evaluating comprises:
program instructions to score, according to a feedback measure, user feedback corresponding to the portion.

15. The computer usable program product of claim 14, further comprising:
program instructions to collect, responsive to the feedback measure being above a threshold feedback measure, a validation score corresponding to a query-response pair comprising the natural language query and the portion.

16. The computer usable program product of claim 15, further comprising:
program instructions to add, responsive to the validation score being above a threshold validation score, the portion to the compendium.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine, using a natural language analysis, that a compendium requires an addition of a natural language response to a natural language query, the compendium comprising a set of stored natural language responses to natural language queries;

program instructions to score, according to a query relevance measure, a relevance of a portion of narrative text to the natural language query, the portion extracted from a corpus of narrative text; and program instructions to enhance, according to the query relevance score, the compendium with information in the portion.

20. The computer system of claim 19, wherein the natural language analysis comprises a natural language classifier, wherein determining that the compendium requires an addition of a natural language response to a natural language query comprises determining, using the natural language classifier, that a classification of the natural language query into any of the set of stored natural language responses is below a first threshold confidence level and above a second threshold confidence level, the first threshold confidence level being above the second threshold confidence level.

* * * * *